United States Patent
Gupta et al.

(10) Patent No.: US 9,989,941 B2
(45) Date of Patent: Jun. 5, 2018

(54) SOLID CHEMISTRY SUPPLY MANAGEMENT SYSTEM

(71) Applicant: Ecolab USA Inc., St. Paul, MN (US)

(72) Inventors: Amit Gupta, Aurora, IL (US); Divesh Bhatia, Pune (IN); Chen Yao, Naperville, IL (US); Vaideeswaran Sivaswamy, Pune (IN)

(73) Assignee: ECOLAB USA INC., St. Paul, MN (US)

( * ) Notice: Subject to any disclaimer, the term of this patent is extended or adjusted under 35 U.S.C. 154(b) by 148 days.

(21) Appl. No.: 14/557,600

(22) Filed: Dec. 2, 2014

(65) Prior Publication Data

US 2016/0154411 A1    Jun. 2, 2016

(51) Int. Cl.
| | |
|---|---|
| G05D 11/00 | (2006.01) |
| G05B 15/02 | (2006.01) |
| G06Q 10/08 | (2012.01) |
| G06Q 50/06 | (2012.01) |

(52) U.S. Cl.
CPC ........... *G05B 15/02* (2013.01); *G06Q 10/087* (2013.01); *G06Q 50/06* (2013.01)

(58) Field of Classification Search
CPC ................................ G05B 15/02; G05D 11/00
See application file for complete search history.

(56) References Cited

U.S. PATENT DOCUMENTS

| | | | |
|---|---|---|---|
| 4,353,482 A | 10/1982 | Tomlinson et al. | |
| 4,858,449 A | 8/1989 | Lehn | |
| 6,418,958 B1 | 7/2002 | Rossi et al. | |
| 2002/0019709 A1* | 2/2002 | Segal | G07C 1/10 702/45 |
| 2013/0161265 A1 | 6/2013 | Fox et al. | |
| 2013/0233796 A1 | 9/2013 | Rao et al. | |

FOREIGN PATENT DOCUMENTS

| | | |
|---|---|---|
| EP | 2437206 A1 | 4/2012 |
| WO | WO 2006/037354 A1 | 4/2006 |

OTHER PUBLICATIONS

PCT International Search Report and Written Opinion for corresponding application PCT/US2015/062570, dated Mar. 17, 2016 (17 pages).
Koenraad F. Beckers et al., Introducing Geographies V1.0: Software Package for Estimating Levelized Cost of Electricity and/or Heat from Enhanced Geothermal Systems, 8 pgs., Proceedings, Thirty-Eighth Workshop on Geothermal Reservoir Engineering Stanford University, Feb. 11-13, 2013.

* cited by examiner

*Primary Examiner* — Shogo Sasaki
(74) *Attorney, Agent, or Firm* — Eric D. Babych; Brinks Gilson & Lione (57) ABSTRACT

A system for management of solid chemistry supply can be configured to use operating attributes and sensed operating conditions associated with a process to estimate solid chemistry supply levels. The system can also be configured to control a feeder attached to a solid chemistry supply container. The control can include controlling a dose of a solid chemistry product to the container according to the estimation. The system can also be configured to communicate a message regarding an insufficient supply of the solid chemistry product.

2 Claims, 6 Drawing Sheets

SOLID CHEMISTRY SUPPLY MANAGEMENT SYSTEM

BACKGROUND

This application relates to a system for management of a solid chemistry supply. For example, this application relates to systems for monitoring solid chemistry supply levels in closed containers.

Solid chemistry products can be used in industrial processes to maintain parts of such processes. Example parts of a process can include a solid chemistry supply container and plumbing connected to the container. Solid chemistry products can be used to maintain efficiency and effectiveness in a process. For example, in power plants, solid chemistry products can be used to control corrosion and buildup of mineral and organic deposits. Such corrosion and buildup can cause inefficiencies in the plant. Corrosion and buildup can also cause problems in other types of processes and can even cause a breakdown of such processes.

Where a solid chemistry product is used to maintain plumbing and fluids (such as working fluids), it can be difficult to monitor the chemistry, especially where the plumbing and the supply container is enclosed. For example, the plumbing can enclose a supply container and walls can enclose the plumbing. Further, supply containers are usually closed, locked, and pressurized, so restocking and monitoring supplies can be laborious. Also, monitoring and restocking supply containers can bring up safety concerns due to the sometimes hazardousness of solid chemistry and fluid combined with the solid chemistry. Additionally, depth and other environmental conditions of a container can make it difficult to inspect the quality of the solid chemistry and corresponding mixtures of the solid chemistry even when the container is opened.

Therefore, there are engineering problems to be solved in order to provide more effective and efficient management of solid chemistries, especially in closed and pressurized containers. Resolution of such engineering problems is important considering the importance of management of solid chemistries. For example, as mentioned, the efficiency of a power plant may depend in part on the effectiveness of solid chemistries in plumbing of the plant. This is especially the situation when pressurization and other thermodynamic qualities are dependent on solid chemistries working optimally. The resolution of these technical issues can benefit processes in providing more effective and efficient use of solid chemistries, which may result in more efficient processes using such products. The novel technologies described herein set out to solve the aforementioned example problems and improve the management of solid chemistries, so to improve efficiency and effectiveness in processes that use solid chemistries to control fluid quality.

BRIEF DESCRIPTION OF THE DRAWINGS

Systems and methods described herein may be better understood with reference to the following drawings and description. Non-limiting and non-exhaustive examples are described with reference to the drawings. The components in the drawings are not necessarily to scale. In the drawings, like referenced numerals designate corresponding parts throughout the drawings.

FIGS. 2 and 3 are block diagrams of example computers that can be used within the example computer network architecture 100 of FIG. 1.

DETAILED DESCRIPTION

Systems and methods, such as the system, will now be described more fully hereinafter with reference to the drawings, which show by way of illustration examples of the systems and methods. The systems and methods can be embodied in a variety of different forms, so covered or claimed subject matter is intended to be construed as not being limited to examples set forth herein; examples are provided merely to be illustrative. The systems and methods may be embodied as apparatuses or non-transitory computer readable mediums. The following detailed description is not intended to be limiting on the scope of what is claimed.

Overview

This application describes systems and methods, such as the system, for monitoring and managing solid chemistry supply in a supply container (such as a pressurized solid chemistry supply container). The monitoring and managing of the solid chemistry supply may occur without opening the container or a respective enclosure at least partially encompassing the container. The systems and methods can also monitor and manage liquid chemistry products using systems and methods analogous to the techniques described herein. The systems and methods described herein can be applied to solid chemistry supply containers found in any type of process. For example, the techniques described herein can be applied to solid chemistry supply containers found in power plants (such as geothermal power plants), other energy services including oil well and drilling services, mining, manufacturing, and large buildings (such as office buildings, hotels, and hospitals). The containers can include tank feeders. Also, a container can be an enclosed feeder device. For example, a feeder device can be enclosed by plumbing of a process.

Solid chemistry products may include a solid biocide, a solid scale inhibitor, a dispersant, a corrosion inhibitor, a pH modifier, a disinfecting agent, a cleaning chemical, a sanitizer, a coagulant, a fuel additive, a pour point modifier, and a dewatering agent. Solid biocide may include biocide oxidizers such as bleach and hydrogen peroxide.

In a tank feeder, a solid chemistry product can be enclosed in the tank and water is run through a feeder receiving doses of the solid chemistry product. This can result in the tank becoming pressurized. As water flows through the tank, the solid chemistry product gradually dissolves and is carried into fluid of a process, such as a working fluid. Levels of the solid chemistry product in the supply container can then be estimated (e.g., forecasted) and managed according to the estimation and information on process conditions indicative of solid chemistry supply levels. Also, dosage rates and water flow rates can be input for solid chemistry supply level estimation. Also, estimated levels can be correlated with estimated solid chemistry consumption rates, and such rates can be used as input (e.g., feedback) for further estimations of inventory requirements.

Prior, operators would depressurize a supply container, open it, and inspect it manually (e.g., visually), which is laborious and can be hazardous depending on thermodynamic conditions and chemical makeup in the container. Also, in examples with a tank feeder, restocking of the solid chemistry product to the feeder can be laborious and hazardous. By estimating solid chemistry inventories, solid chemistry management tasks can be automated instead of done manually. This reduces labor costs and safety risks.

Restocking of solid chemistry product in a feed, dosage of the chemistry into flowing fluid (such as water), and fluid flow rate through a supply container can be controlled automatically according to the estimated solid chemistry supply levels and/or the information on process conditions indicative of solid chemistry supply levels. In an example, the supply levels in the feeder can be directly correlated to levels of the chemistry in a fluid used in a respective process. As the solid chemistry supply levels go down, the levels of solid chemistry product dissolved in the fluid can decrease. In such an example, a restocking event can be sensed and automatically trigger the restart of product level estimation.

Besides use of the systems for management and estimation of solid chemistry supply levels, the systems can be used for management and estimation of bacterial growth, corrosion, mineral scale formation, and organic buildup in a process, and the effects of solid chemistry levels and inventory on the aforementioned. Likewise, the systems can manage and estimate the effects of solid chemistry supply levels on thermodynamic properties in a process. Also, the systems can manage and estimate the effects of solid chemistry levels and inventory on other types of operational conditions and attributes, such as oxidation/reduction potential (ORP), conductivity, relay on time of a pump or solenoid, and blowdown time.

The system can estimate solid product inventory information using process information. Process information may include various operating conditions in a process, such as ORP or pH of a fluid. For example, the process information may include ORP or pH of water in a water cooling system, such as at a cooling tower of a power plant or food/beverage manufacturing plant. Using process information, a tool, such as an analytics tool can estimate solid chemistry supply levels in a container. This allows for management of solid chemistry supply and feeding without opening the container to estimate solid chemistry supply levels. For example, without opening the container or a respective enclosure, an operator of a process, such as an operator of a power plant or a plumbing system of a large building, can determine whether to change the container or add more solid chemistry product to the container. Also, a sales person could use such a tool to alert operators to do the same, and use the tool as a way to accelerate sales of solid chemistry products and services. These alerts are especially useful at a a food or beverage manufacturing plant, where there are many cooling towers using solid chemistry products for maintenance and tracking solid chemistry products manually is difficult.

In an example, the process information can include ORP. A positive ORP correlates to an affinity for electrons and a tendency to be reduced. A negative ORP correlates to an affinity to lose electrons and a tendency to be oxidized. ORP can be used as a measurement of quality of a fluid in a process, such as a measurement of quality of water or brine. ORP of a fluid can be lowered by bacteria in the fluid. For example, fluid with an ORP of 200-250 mV may be an acceptable range, but excessive organic buildup and bacteria may cause the ORP to drop below 200 mV. Unwanted minerals and other types of inorganic compounds may cause such changes too. The ORP drop can be sensed and then used to alert system operators.

ORP can be measured by sensors for sensing electromagnetic fluid conditions, such as electromagnetic water conditions and electromagnetic brine conditions. The measured ORP can then be inputted into a model. A tool, such as an analytics tool, using the model can estimate (e.g., forecast) solid chemistry supply levels. In this sense, process information fed back to the analytics tool is used to determine solid chemistry supply levels instead of manually inspecting the levels. The estimated product supply levels can be outputted to a graphical user interface.

Additionally or alternatively, the process information used by the analytics tool to determine solid chemistry supply levels can include relay on time of a pump or a solenoid in the process. Also, conductivity of a measured fluid and blowdown time and amounts can be used. Further, any thermodynamic information, other electromagnetic information, chemical properties (such as acidity or composition), or any combination thereof, can be used by the analytics tool to estimate and/or manage solid chemistry supply levels.

The systems can include a computer application (such as a web application implemented at least partially by electronic circuitry) that is configured to model relationships between process information and solid chemistry supply levels. The computer application can also be configured to output information pertinent to solid chemistry supply, solid chemistry levels, corrosion, mineral buildup, and organic buildup within a container. Further, models, such as the aforementioned model and related thermodynamic models can evolve with use according to feedback. Evolutions of the modeling can be stored by data storage devices communicatively coupled to the computer application.

In one example, process information can be determined and such information can be used as input with thermodynamic and/or electromagnetic models, respective container specifications, solid chemistry product information, or any combination thereof to estimate the solid chemistry level within the container. On the other hand, in another example, solid chemistry of a container can be estimated, and such an estimation be used as input with thermodynamic and/or electromagnetic models, container specifications, solid chemistry product information, or any combination thereof to predict pressurization or any other correlated environmental condition within a respective process. Other conditions predicted may include temperature, pH, and levels of corrosion, mineral scale formation, and organic buildup.

The aforementioned estimations can be adapted for a single container, multiple containers in a system, multi-compartment containers, or any combination thereof. The estimations can be outputted in various ways, such as displayed on a touch screen, and can be used as a tool to assist in the management and/or selling of solid chemistry products and services. The estimations can provide both solid chemistry product and dosage suggestions, in addition to inventory information.

The systems may include a solid chemistry sales acceleration tool that can assist a solid chemistry salesperson as well as a solid chemistry analytical tool that can provide any of the analysis described herein. The systems may also include a corresponding management tool. These tools may include an audio and/or visual user interface served from a computer and used via a corresponding client-side application, such as a web browser. These tools can be implemented through computer hardware, software, or any combination thereof such as firmware. In an example, the client-side application can be used by a sales representative to sell or inform process operators of solid chemistry supply needs and estimated physical states of corresponding supply containers and connected processes.

DESCRIPTION OF THE DRAWINGS

Figure 1:
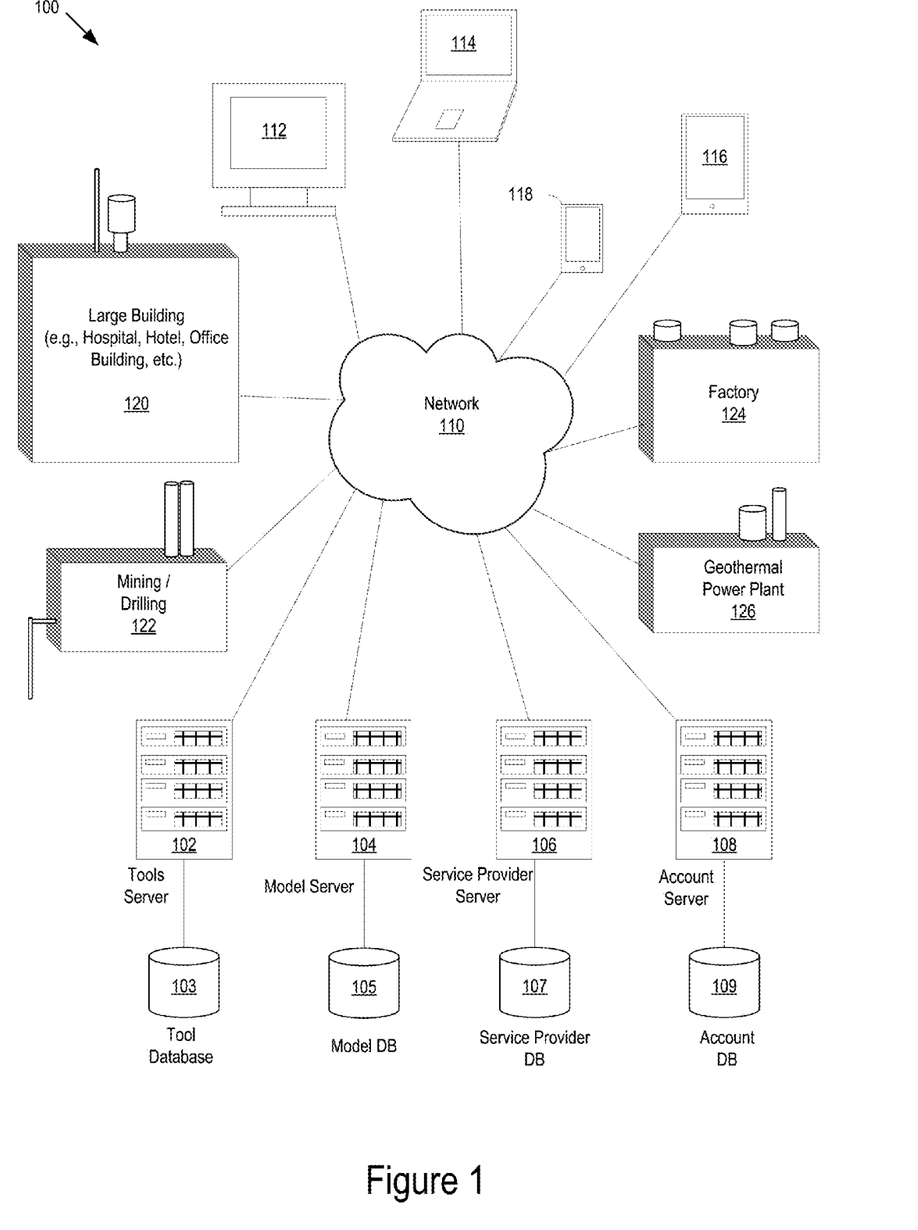
FIG. 1 illustrates a block diagram of an example computer network architecture 100 that includes example computers of a network that can provide solid chemistry supply management. The example computer network architecture is part of a solid chemistry supply management system (the "system").

FIG. 1 illustrates a block diagram of an example computer network architecture 100 that includes example computers of a network that can provide solid chemistry supply management. The computer network architecture 100 in the example of FIG. 1 includes a tools server 102, a tools database 103, a thermodynamic and/or electromagnetic model server 104, a thermodynamic and/or electromagnetic model database 105, a service provider server 106, a service provider database 107, an account server 108, and an account database 109. The aforementioned servers and databases can be communicatively coupled over a network 110. The computer network architecture 100 may be accessible over the network 110 by end user devices (such as end user devices 112, 114, 116, and 118) and by computers associated with various processes (such as computers communicatively coupled to sensors installed within a large building 120, a mining/drilling system 122, a factory 124, and a geothermal power plant 126).

The computer network architecture 100 may be implemented at least partially in a cloud-computing environment, at least partially in a server, at least partially in a client device, or in a combination thereof.

The tools server 102 stores sales, analytics, and management tools information for selling, analysis, and management of solid chemistry supply (such as supply provided by supply containers within a process). Further, the tools server 102 can serve a server-side part of the sales, analytics, and management tools.

The tools server 102 is in data communication with the tools database 103. Sales, analytics, and management tools information may include database records associated with operating conditions and parameters of each respective process that it serves. Suitable information may be stored, maintained, updated and read from the tools database 103 by the tools server 102. The sales, analytics, and management tools information can also include account information received from the account server 108, such as process operator identification information, operator security information (e.g., passwords and other security credentials), and account balance information.

The tools server 102 may be implemented using a single server computer, a plurality of server computers, or other types of computing devices known in the art. Access to the account server 108 can be accomplished through a firewall that protects the sales, analytics, and management tools and associated information from external tampering. Additional security may be provided via enhancements to the standard communications protocols, such as Secure HTTP (HTTPS) or the Secure Sockets Layer (SSL). Such security may be applied to any of the servers of FIG. 1.

The tools server 102 may provide an operator graphical user interface to simplify the process of accessing the sales, analytics, and management tools parameters and information. The operator graphical user interface of the sales, analytics, and management tools may be a circuit, program, application, or software routine that forms a user interface. In a particular example, the operator graphical user interface is accessible as a website. Through the graphical user interface, the operator may add, view, and change sales, analytics, and management tools parameters and information, generate reports based on such parameters and information, and store the parameters and information in the tools database 103. The sales, analytics, and management tools related data may be viewed in real time using the operator graphical user interface. A script and/or applet may be a part of this graphical user interface and may render access points for retrieval of sales, analytics, and management tools related data. The script and/or applet may be implemented via a circuit. In an example, this graphical user interface may include a graphical display of fields for selecting various aspects of sales, analytics, and management tools related data. The graphical user interface, via the script and/or applet, can request the various aspects of sales, analytics, and management tools related data. The information can then be displayed, such as displayed according to the script and/or applet. Such an operator graphical user interface may be applied to any of the servers of FIG. 1.

In an example, the sales, analytics, and management tools can be served from the tools server 102 and used via a corresponding client-side application, such as a web browser. Such a client-side application may be rendered by any of the end user devices 112-118. The client-side application can be used by a sales representative to sell or inform process operators of solid chemistry states in containers and inventory solutions for optimizing management of such containers. The sales, analytics, and management tools can display an output of graphical elements that include components of a process with a visually pleasing layout. The tools can also display detailed pages per component of a monitored process, such as per container. Also, a unit converter of the tools can allow for the display of data in various unit formats. Benefits of the tools are the ability to model and display process configurations, such as configurations pertaining to inline containers, and predict and display various estimated environmental conditions such as ORP, pressure, temperature, pH, scaling, organic buildup, and corrosion data in real time according to user selected process configurations. Such configurations can be selected via a user-friendly graphical user interface.

Figure 2:
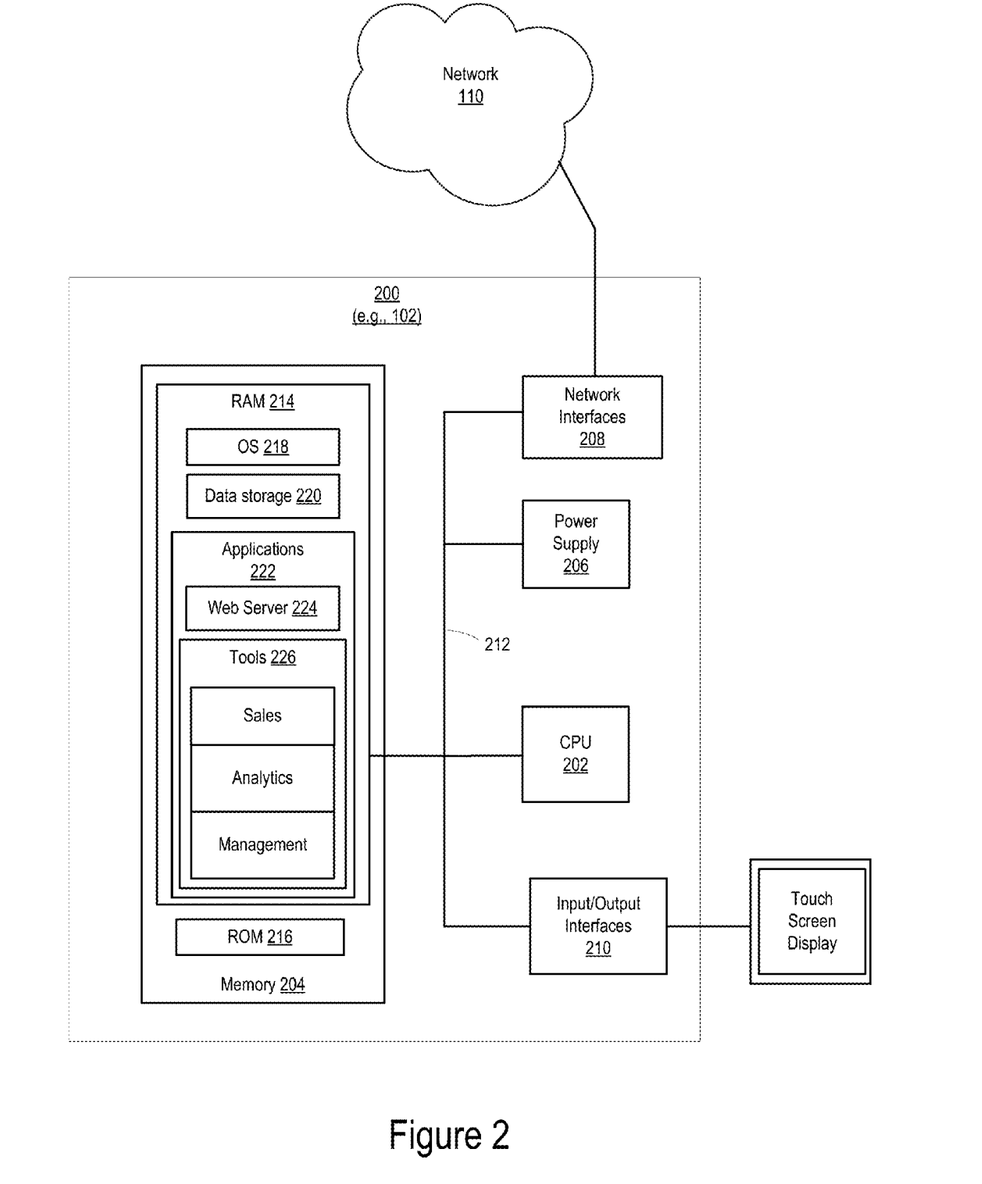
FIG. 2 illustrates an example computer that can implement server-side aspects of the system.

FIG. 2 illustrates an example computer 200 that can implement the tools server 102 of FIG. 1. The computer 200 can include a central processing unit (CPU) 202, a memory circuit 204, a power supply circuit 206, and input/output circuits, such as network interfaces 208 and input/output interfaces 210, and a communication bus 212 that connects the aforementioned elements of the computer. The network interfaces 208 can include a receiver and a transmitter (or a transceiver), and an antenna for wireless communications. The CPU 202 can be any type of data processing device, such as a central processing unit (CPU). Also, the CPU 202 can be central processing logic; central processing logic may include hardware (such as circuits and/or microprocessors), firmware, software and/or combinations of each to perform functions or actions, and/or to cause a function or action from another circuit of the computer 200. Also, central processing logic may include a software controlled microprocessor, discrete logic such as an application specific integrated circuit (ASIC), a programmable/programmed logic device, memory device containing instructions, a combinational logic embodied in hardware, or any combination thereof. Also, logic may also be fully embodied as software.

The memory circuit 204, which can include random access memory (RAM) 214 or read-only memory (ROM) 216, can be enabled by memory hardware, such as a primary (directly accessible by the CPU) and/or a secondary (indirectly accessible by the CPU) storage device (such as flash memory, magnetic disk, optical disk).

The RAM 214 can store data and instructions defining an operating system 218, data storage 220, and applications 222, including a web server 224 and a web application such as the sales, analytics, and management tools 226. The sales, analytics, and management tools 226 can include sub-applications such as corresponding user interfaces for sales and management of solid chemistries. Each of these applications and sub-applications may be implemented via circuits. The circuits may be combined with scripts and/or applets. The applications 222 and sub-applications may include hardware (such as circuits and/or microprocessors), firmware, software, or any combination thereof. Example information provided by an application, such as the sales, analytics, and management tools 226, may include text, images, audio, video, or any combination thereof, which may be processed in the form of physical signals, such as electrical signals, or may be stored in memory, as physical states.

The ROM 216 can include basic input/output system (BIOS) of the computer 200. The power supply circuit 206 contains power components, and facilitates supply and management of power to the computer 200. The input/output circuits can include various types of interfaces for facilitating communication between components of the computer 200, components of external computers (such as components of other computers of the computer network architecture 100), and end users. For example, such circuits can include a network card that is an integration of a receiver, a transmitter, and I/O interfaces. The network interfaces 208 may include a network card. A network card can facilitate wired or wireless communication with other computers and network devices of a network. In cases of wireless communication, an antenna can facilitate such communication. The I/O components, such as I/O interfaces 210, can include user interfaces such as monitors, keyboards, touchscreens, microphones, and speakers.

The sales, analytics, and management tools can also use existing thermodynamic and/or electromagnetic models, received from the thermodynamic and/or electromagnetic model server 104, to predict the solid chemistry supply levels. Data corresponding to these models may be stored and organized by the model database 105.

The thermodynamic and/or electromagnetic model server 104 stores and serves thermodynamic and/or electromagnetic modeling information for analysis of processes (such as operations using fluids treated by solid chemistry products and services). The thermodynamic and/or electromagnetic modeling information can include third party models, such as models used to calculate solubility product constants (K) and ion activity products (Q) for solutes in well chemistry. These calculations can be made according to real time production data and historical production data. Also, steam and brine chemistry distribution, concentration factor of the brine after a steam separator, temperature of the brine (above or below the surface) can be calculated according to various geothermometers. Also, the thermodynamic and/or electromagnetic model server 104 can store and serve STEAM 97, which the sales, analytics, and management tools can use to calculate thermodynamic and transport properties of water and steam. Information associated with the thermodynamic and/or electromagnetic model server 104 may be stored in the thermodynamic and/or electromagnetic model database 105.

The service provider server 106 stores service and product information for improving and maintaining operations (such as operations within the large building 120, the mining/drilling system 122, the factory 124, and the geothermal power plant 126). The service and product information may include various solid chemistry services and products for inhibiting mineral scaling, organic buildup, and corrosion in parts of processes, such as plumbing. Similar to the other servers described herein, various security measures and operator graphical user interfaces may be adapted to work with the service provider server 106. Data associated with the service provider server 106 may be stored in the service provider database 107.

The account server 108 stores account information for operators of processes (such as operators of the large building 120, the mining/drilling system 122, the factory 124, and the geothermal power plant 126). The account server 108 is in data communication with the account database 109. Account information may include database records associated with each respective operator of a process. Suitable information may be stored, maintained, updated and read from the account database 109 by the account server 108. Examples include operator identification information, operator security information, such as passwords and other security credentials, account balance information, and information related to operations of the operator's processes.

Similar to the other servers described herein, the account server 108 may be implemented using a single server computer, a plurality of server computers, or other types of computing devices known in the art. Access to the account server 108 can be accomplished through a firewall that protects the account management programs and the account information from external tampering. Additional security may be provided via enhancements to the standard communications protocols, such as Secure HTTP (HTTPS) or the Secure Sockets Layer (SSL).

Similar to the other servers described herein, the account server 108 may provide an operator graphical user interface to simplify the process of accessing the information, such as account information of an operator. The operator may view and edit account data, and after editing the account data, the account data may then be saved to the account database 109. Account data may be viewed in real time using the operator graphical user interface.

The aforementioned servers and databases may be implemented through computers. A computer may be capable of sending or receiving signals, such as via a wired or wireless network, or may be capable of processing or storing signals, such as in memory as physical memory states, and may operate as a server. Computers capable of operating as a server may include dedicated rack-mounted servers, desktop computers, laptop computers, integrated devices, and any combination thereof. Each server computer may include a central processing unit and memory. A server may also include a mass storage device, a power supply, wired and wireless network interfaces, input/output interfaces, and/or a computer operating system, such as Windows Server. The aforementioned servers and databases may be part of online information systems or may be in communication with other online information systems. An online information system may include a computer that includes a configuration to provide data via a network to another computer, including in response to received requests for information. An online information system may host a website, such as a website of a service provider.

Examples of information described herein, such as information managed in an online information system, may include text, images, audio, video, and any combination thereof, which may be processed in the form of physical signals, such as electrical signals, or may be stored in memory, as physical states, as another example. The processing and storage of information described herein may be implemented via electronic circuitry, such as an ASIC.

The network 110 may include a data communication network or a combination of networks. A network may couple devices, such as computers of a computer network, so that communications may be exchanged, such as between a server and a client device or other types of devices, including between wireless devices coupled via a wireless network. The network 110 may include mass storage, such as a network attached storage (NAS), a storage area network (SAN), or other forms of computer or machine-readable media. The network 110 may include the Internet, local area networks (LANs), wide area networks (WANs), wire-line type connections, wireless type connections, or any combination thereof.

Any of the end user devices 112-118 may include a central processing unit that may access any server or database of the computer network architecture 100 over the network 110. Any of the end user devices 112-118 may be operative to interact over the network 110 with any server or database of the computer network architecture 100. Any of the end user devices 112-118 may implement a client-side application for viewing electronic properties and submitting user requests, and may communicate data to any server or database of the computer network architecture 100, including data defining electronic properties and other information. Any of the end user devices 112-118 may receive communications from any server or database of the computer network architecture 100, including data defining electronic properties and operations information. The aforementioned interactions and information may be logged in data logs and such logs may be communicated to an analytics server for processing, such as the tools server 102. Once processed into corresponding analytics data (such as sales, analytics, and management tools data), such data can be input for determining products and solutions to maintain and improve operations, including maintaining solid chemistry supply.

Any of the end user devices 112-118 may include a computing device, such as a computer, capable of sending or receiving signals, such as via a wired or a wireless network. A client device may include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, and any combination thereof. In FIG. 1, end user device 112 is a desktop computer, end user device 114 is a laptop computer, end user device 116 is a tablet computer, and end user device 118 is a smartphone. Any of the end user devices 112-118 may vary in terms of capabilities or features. Also, any of the end user devices 112-118 may include or may execute a variety of operating systems, including a personal computer operating system. A client device may also include or execute an application to communicate content, such as, textual content, multimedia content, or the like.

Figure 3:
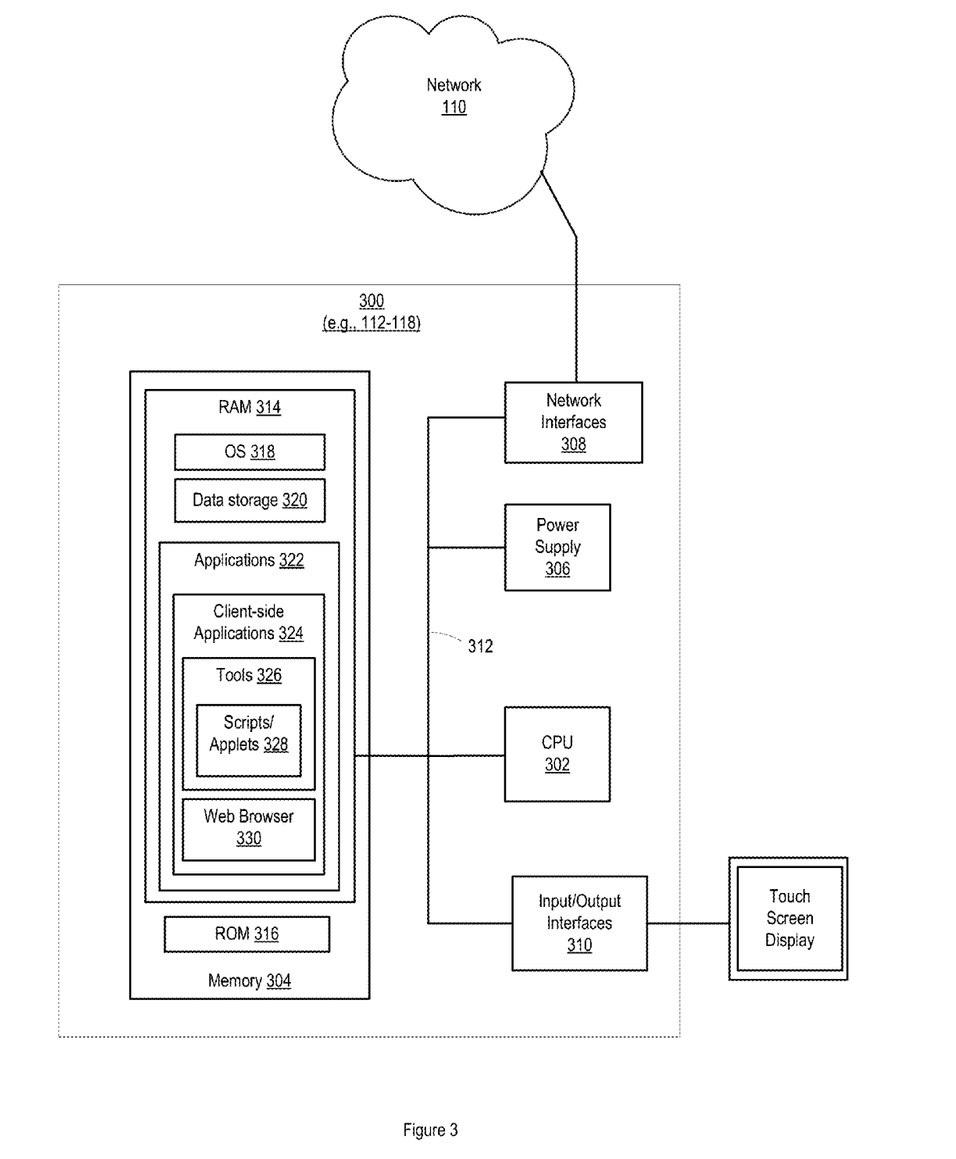
FIG. 3 illustrates an example computer that can implement client-side aspects of the system.

FIG. 3 illustrates an example computer 300 that can implement client-side parts of the sales, analytics, and management tools, such as the client-sides to the server-sides of the sales, analytics, and management tools 226 of FIG. 2. The computer 300 can include a central processing unit (CPU) 302, a memory circuit 304, a power supply circuit 306, and input/output circuits, such as network interfaces 308 and input/output interfaces 310, and a communication bus 312 that connects the aforementioned elements of the computer. The network interfaces 308 can include a receiver and a transmitter (or a transceiver), and an antenna for wireless communications. The CPU 302 can be any type of data processing device, such as a central processing unit (CPU). Also, the CPU 302 can be central processing logic; central processing logic may include hardware (such as circuits and/or microprocessors), firmware, software and/or combinations of each to perform functions or actions, and/or to cause a function or action from another circuit of the computer 300. Also, central processing logic may include a software controlled microprocessor, discrete logic such as an ASIC, a programmable/programmed logic device, memory device containing instructions, a combinational logic embodied in hardware, or any combination thereof. Also, logic may also be fully embodied as software.

The memory circuit 304, which can include random access memory (RAM) 314 or read-only memory (ROM) 316, can be enabled by memory hardware, such as a primary (directly accessible by the CPU) and/or a secondary (indirectly accessible by the CPU) storage device (such as flash memory, magnetic disk, optical disk).

The RAM 314 can store data and instructions defining an operating system 318, data storage 320, and applications 322, including client-side applications 324 such as client-side parts of the sales, analytics, and management tools 326. The client-side parts of the sales, analytics, and management tools 326 can include sub-applications such as corresponding scripts/applets 328. Also, the client-side part of the sales, analytics, and management tools 326 may be implemented through a web browser 330. Each of these applications may be implemented physically via circuits. The applications 322 and sub-applications may include hardware (such as circuits and/or microprocessors), firmware, software, or any combination thereof. Example information provided by an application, such as the client-side parts of the sales, analytics, and management tools 326, may include text, images, audio, video, or any combination thereof, which may be processed in the form of physical signals, such as electrical signals, or may be stored in memory, as physical states.

The ROM 316 can include basic input/output system (BIOS) of the computer 300. The power supply circuit 306 contains power components, and facilitates supply and management of power to the computer 300. The input/output circuits can include various types of interfaces for facilitating communication between components of the computer 300, components of external computers (such as components of other computers of the computer network architecture 100), and end users. For example, such circuits can include a network card that is an integration of a receiver, a transmitter, and I/O interfaces. The network interfaces 308 may include a network card. A network card can facilitate wired or wireless communication with other computers and network devices of a network. In cases of wireless communication, an antenna can facilitate such communication. The I/O components, such as I/O interfaces 310, can include user interfaces such as monitors, keyboards, touchscreens, microphones, and speakers.

Figure 4:
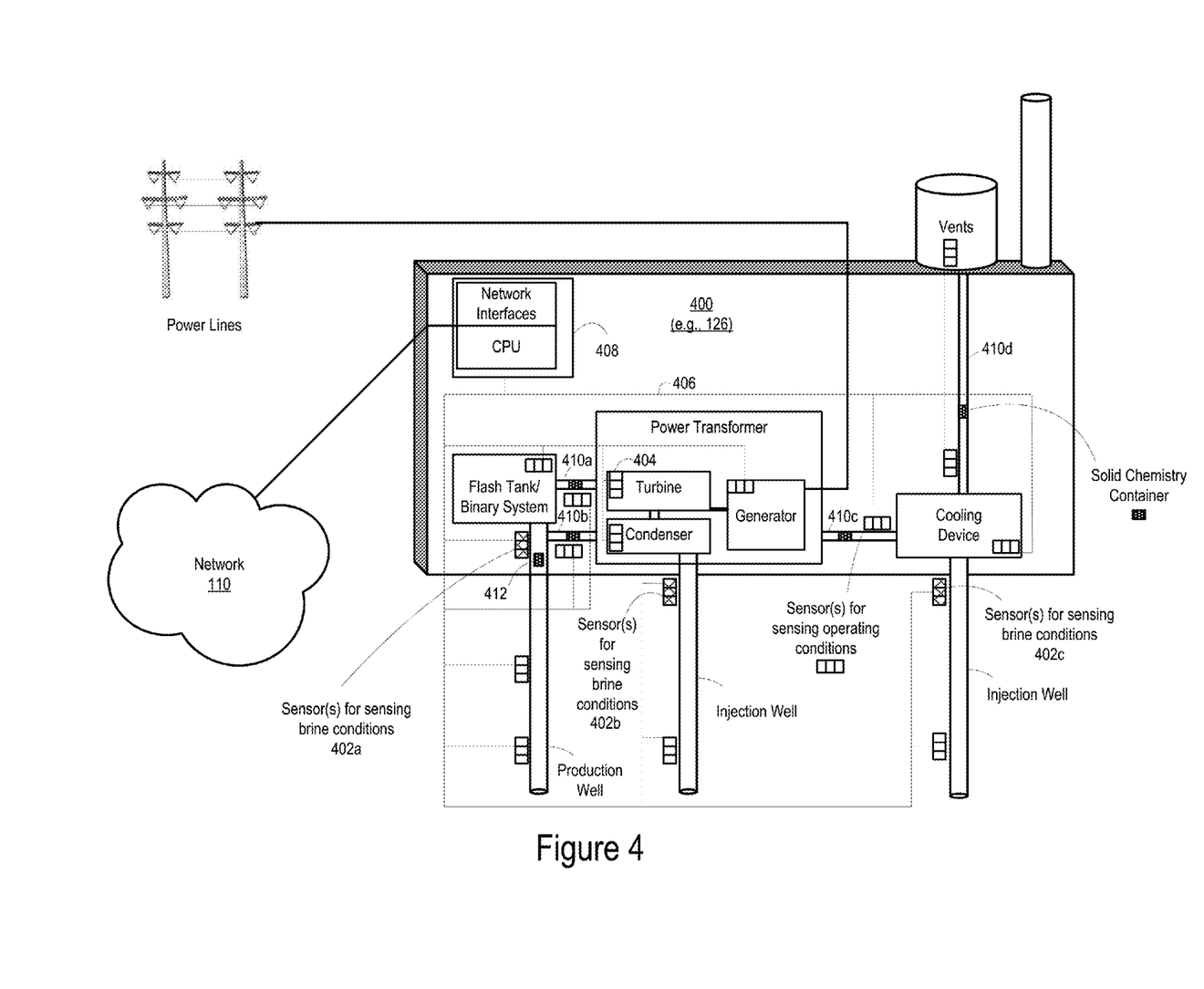
FIG. 4 illustrates an example geothermal power plant having at least one computer communicatively coupled to the computer network architecture 100 of FIG. 1.

Processes, such as processes within the large building 120, the mining/drilling system 122, the factory 124, and the geothermal power plant 126, each may include at least one computer and a network of sensors. The at least one computer may provide an interface between the network of sensors and other computers of the computer network architecture 100. FIG. 4 illustrates, in more detail, such an example process.

FIG. 4 illustrates an example geothermal power plant 400 (the "plant 400"), such as the geothermal power plant 126 of FIG. 1. The plant 400 includes a production well connected to a flash tank and/or a binary system. In some examples, there may be more than one production well that feeds into the flash tank or binary system. In such examples, there may be a part prior to the flash tank that mixes the brines from the multiple production wells. Such a part may be connected to or include a solid chemistry supply container. In FIG. 4, the flash tank is connected to a geothermal power transformer, which includes a turbine, a condenser, and a generator. The generator is connected to power lines for delivery of electrical power generated by the generator. The geothermal power transformer is connected to a respective injection well. The geothermal power transformer is also connected to a cooling device. The cooling device is connected to a respective injection well and vents. Plumbing that connects each of these parts may be connected to or include solid chemistry supply containers.

The plant 400 also includes a network of sensors. The network of sensors includes a communications circuit 406, which connects all the sensors of the network to a computer 408 that includes at least a central processing unit and network interfaces. The network of sensors can include sensors for sensing brine conditions. The brine conditions may include ORP of the brine, temperature of the brine, pressure of the brine, contents of the brine (including contents of the solid chemistry), acidity of the brine, or any combination thereof at a given location of the power plant (such as at a pressurized liquid and/or gas container operating as an energy source of a turbine). For example, sensors 402*a* can sense brine conditions immediately downstream of the flash tank. Sensors 402*b* can sense brine conditions at a head of the injection well connected to the power transformer. Sensors 402*c* can sense brine conditions at a head of the injection well connect to the cooling device.

The network of sensors can also include sensors for sensing other operating conditions of the plant 400, such as operating conditions of a fluid (which can be water). For example, sensors can sense other thermodynamic and electromagnetic conditions in the plant 400, such as the thermodynamic and electromagnetic conditions of the fluid. As depicted sensors for sensing other operating conditions, such as other operating conditions besides those relating to the brine, can reside at various locations of the plant 400, including locations at a binary system, the power transformer, the turbine, the condenser, the generator, the cooling device, and connections between the aforementioned parts of the plant (such as plumbing). In an example, the fluid in a geothermal power plant may include working water and/or the brine from a geothermal source. The working water and the brine may be separated by plumbing, and each fluid may have received its own supply of solid chemistry products.

In FIG. 4, sensors 404 reside in plumbing of the turbine, and the sensors are configured to sense operating conditions (such as liquid or vapor pressure, temperature, and ORP) in the plumbing and output corresponding data via the communications circuit 406 to the computer 408. This is an example of measuring thermodynamic or electromagnetic conditions at strategic points of a process, which can be correlated with effectiveness and efficiency of the process (including the effectiveness of a solid chemistry supply and power output). Conditions related to power output efficiency can be directly affected by a solid chemistry product fed in a process fluid, such as a working fluid. For example, a lack of the appropriate solid chemistry (such as a biocide treatment) may be ineffective at reducing organic buildup and/or bacteria growth that can cause unintended reduction in fluid quality, which can effect operational parameters such as appropriate pressurization.

The computer 408 via its CPU and other circuits can receive and process data associated with the sensed conditions sensed by the various sensors of the network of sensors. After the data is processed, it can be communicated to other computers via the network interfaces of the computer 408 and the network 110 of FIG. 1. The computer 408 can be capable of sending or receiving signals, such as via a wired or wireless network, and/or may be capable of processing or storing signals, such as in memory as physical memory states, and may operate as a server. The computer 408 may be one of a set of computers including dedicated rack-mounted servers, desktop computers, laptop computers, set top boxes, integrated devices combining various features, such as two or more features of the foregoing devices, and any combination thereof. Besides a CPU, the computer 408 may also include memory circuitry.

The plant 400 also includes a network of plumbing, including plumbing 410*a*, 410*b*, 410*c*, and 410*d*, that connects the parts of the plant whose operations include at least the use of fluids (such as working fluids) and/or the brine. Properties of the fluids and/or brine may be maintained by adding a solid chemistry product to the fluids at any part of the plumbing and/or at any one of the parts of the plant, whose operations include at least the use of one of the fluids. Solid chemistry supply containers can supply the solid chemistry product to the plumbing and the connected parts. For example, the fluids can flow through the solid chemistry containers, which cause dispensing of the solid chemistry product into the fluids. Example solid chemistry containers include the solid chemistry container 412 located in the production well. The container 412 can provide solid chemistry to the brine. Also, as illustrated in FIG. 4, solid chemistry containers are positioned at the plumbing 410*a*, 410*b*, 410*c*, and 410*d*. The containers within the plumbing 410*a*, 410*b*, 410*c*, and 410*d* can provide solid chemistry products to the brine and/or the fluids (such as working water).

Figure 5:
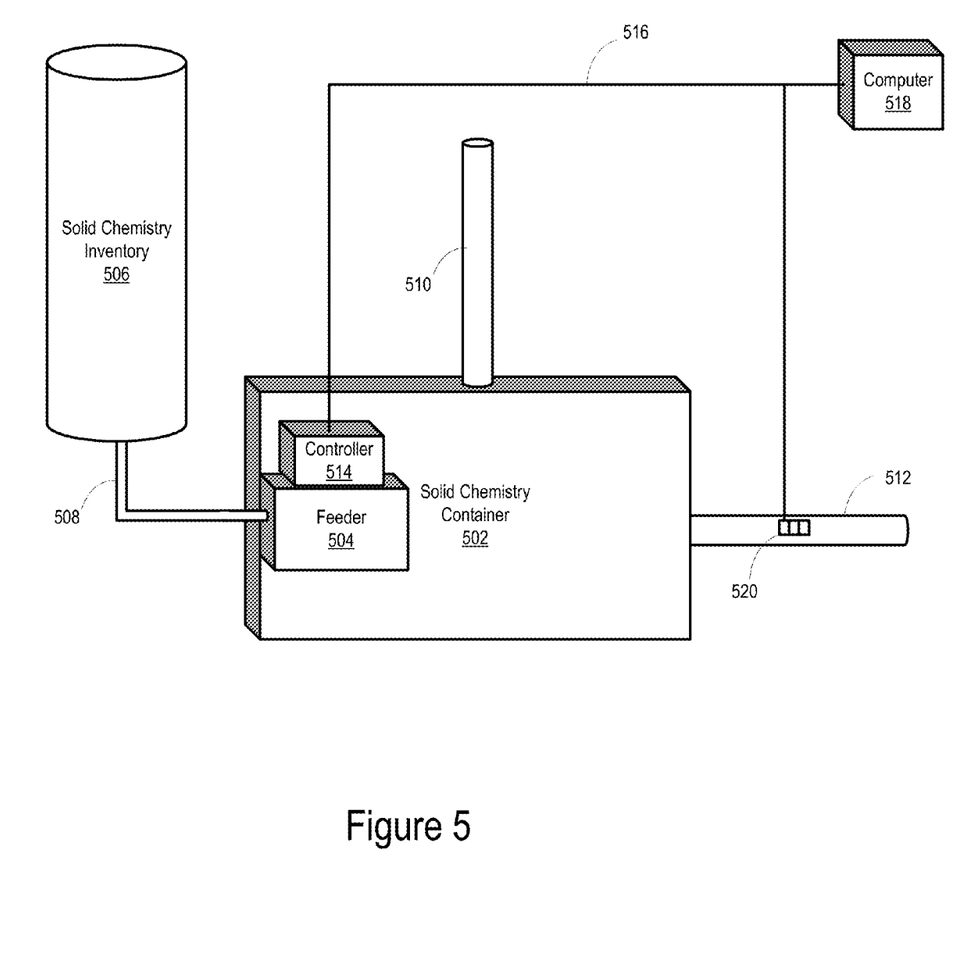
FIG. 5 illustrates example aspects of the system.

FIG. 5 illustrates an example container 502 of a process that incorporates use of solid chemistry to maintain fluid quality. The container 502 can be within an enclosure, such as within plumbing of a process. For example, the container 502 may be within plumbing of the the large building 120, the mining/drilling system 122, the factory 124, and the geothermal power plant 126 illustrated in FIG. 1. Also, the container 502 can be in line with (as depicted in FIG. 5) and/or attached to plumbing. The enclosure and/or the container can be pressurized. This pressurization can facilitate flow of fluid through the container.

The container 502 can include or be attached to a feeder, such as feeder 504. The feeder 504 can be configured to output a dose of a solid chemistry product into the container 502. The feeder 504 can be configured to hold at least a dose of the solid chemistry product and receive fluid that flows through the feeder and dissolves at least the dose of the solid chemistry product. The feeder can be configured to automatically receive at least a dose of the solid chemistry product from a solid chemistry inventory, such as solid chemistry inventory 506. The solid chemistry product can be received via a channel, such as channel 508.

FIG. 5 depicts the container 502 as in line with plumbing of the process that includes input plumbing 510 and output plumbing 512. Fluid flowing into the container 502 from the input plumbing 510 can blend with the fluid within the container that includes the dissolved solid chemistry product. The blend including at least part of the solid chemistry product can then be outputted via the output plumbing 512. As mentioned, the feeder 504 can provide doses of the solid chemistry product to the container 502.

FIG. 5 also depicts a controller 514 (which can be an electromechanical controller) communicatively coupled via a communications circuit 516 to a computer 518 and sensors 520. For example, the computer 518 may include similar functionality as computer 408 illustrated in FIG. 4, and the sensors 520 may include similar functionality as any of the sensors in FIG. 4. The sensors 520 can be configured to sense a process condition in the process. The process condition can include ORP and/or conductivity of a fluid within the process. Operation attributes can be inputted as well, such as relay on time of a pump or solenoid and blowdown time. FIG. 5 also illustrates that the signal can be communicated directly from the sensors 520 via the communications circuit 516 or further processed and then communicated from the computer 518. FIG. 5 depicts the sensors 520 attached to the output plumbing 512, but in such an example, the sensors could be attached to or included within the container 502.

The controller 514 can be configured to receive a process condition signal associated with the process condition, such as a condition sensed by the sensors 520. The signal can be an electromagnetic signal. The controller 514 can be configured to estimate a solid chemistry supply level inside a container according to the process condition signal and a relationship between the process condition and the solid chemistry supply level. The relationship between the process condition and the solid chemistry supply level can be predetermined and/or dynamic. The relationship can be dynamic by being continuously and/or periodically determined. The container can be one of many sources of solid chemistry product outputted to the process. The estimation can be a forecast of future solid chemistry supply levels.

Also, the controller can be configured to electromechanically regulate the feeder 504 according to the estimation of the solid chemistry supply level inside the container.

Figure 6:
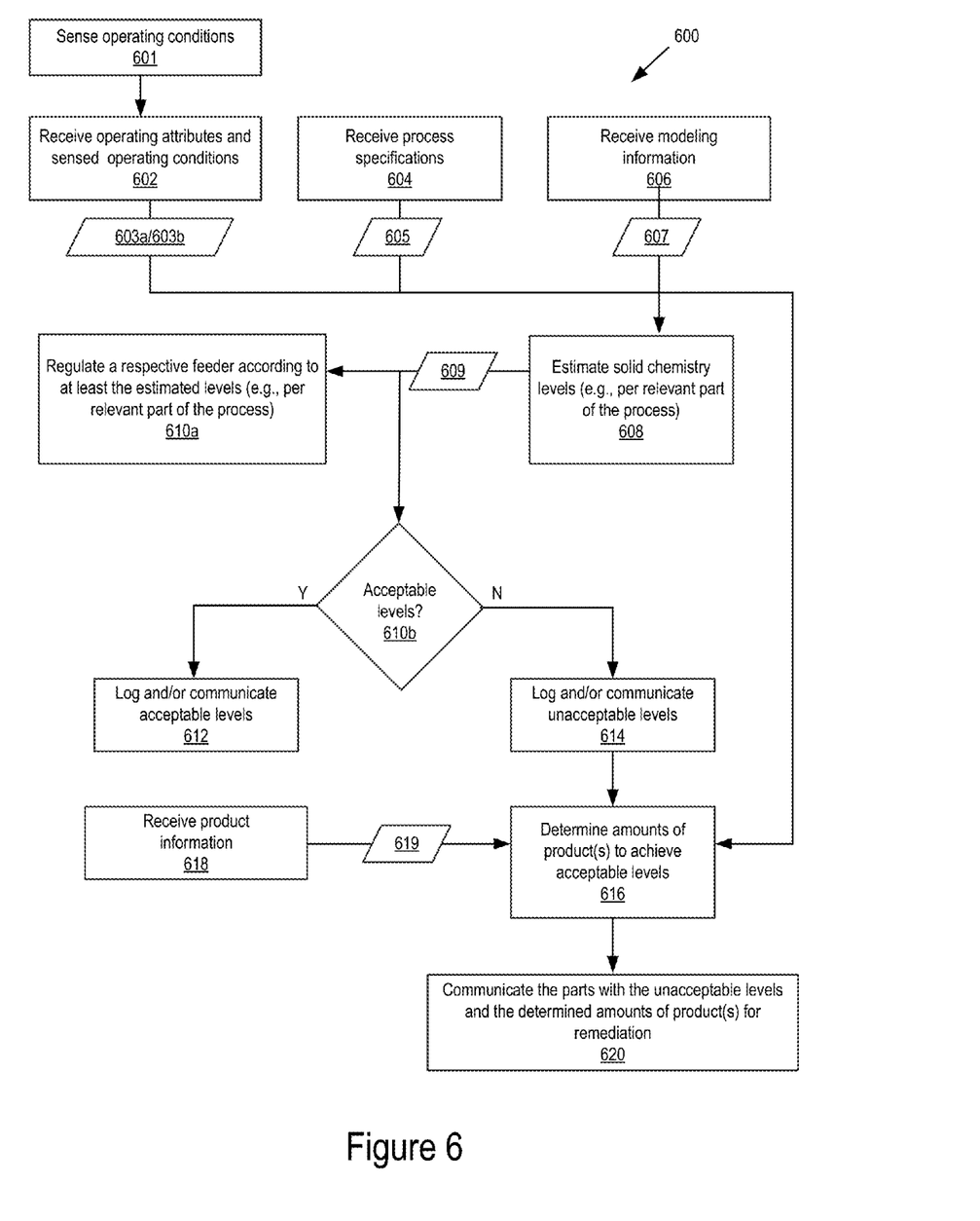
FIG. 6 is a flow diagram of example operations that can be performed by example aspects of or associated with the system.

FIG. 6 illustrates example operations 600 performed by example aspects of the system, including circuits of the example computers of the computer network architecture 100 of FIG. 1, the computer 408 of FIG. 4, the computer 518 of FIG. 5, the controller 514 of FIG. 5, or any combination thereof. In an example, sensors, such as any of the sensors illustrated in FIGS. 4 and 5, can sense operating conditions of a process, at 601. Such sensors can output information associated with the sensed operating conditions. For example, the sensors can output sensed operating condition data 603b, which can include data on ORP, conductivity, or any other type of measurable electromagnetic property, temperature, pressure, or any other type of measurable thermodynamic property, composition, acidity, or any other type of measurable chemical property, or any combination thereof.

In an example, the tools server 102, at a receiver, can receive process information including operating attributes 603a and the sensed operating condition data 603b, at 602. The process information can be communicated from a communications interface of a computer of the process, such as the computer 408 of FIG. 4 or computer 518 of FIG. 5. In another example, the controller 514 and/or the computer 518 can receive process information including the operating attributes 603a and the sensed operating condition data 603b, at 602. Sensed conditions can include ORP, conductivity, pH, or any other type of measurable electromagnetic property, temperature, pressure, or any other type of measurable thermodynamic property, composition, acidity, or any other type of measurable chemical property, or any combination thereof. The operating attributes 603a can include relay on a time of a respective pump or solenoid valve and respective blowdown time.

Besides process information, the tools server 102, the computer 408, the computer 518, or the controller 514 can also receive information pertaining to specifications of the process, at 604. The specifications 605 of the process can specify the type of process, such whether it is a power plant process, factory process, mining or drilling process, or a building environment control process. The specifications can also specify the amounts of parts in the process and their arrangement within the process. For example, with a geothermal power plant, such information may include the amounts and arrangement of production and injection wells, flash tanks, turbines, condensers, generators, power transformers, cooling devices, and vents. The specifications can also include products used to maintain various operating conditions at the various parts of the process. Such products may include corrosion inhibitors, mineral scaling inhibitors (such as silica inhibitors and calcite inhibitors), and organic buildup inhibitors (such as various biocides). The specifications of the process can be communicated from a communications interface of a computer of that process, such as the computer 408 or the computer 518. Also, the specifications can be communicated from the account server 108 and/or the service provider server 106 of FIG. 1.

Also, at 606, the tools server 102, the computer 408, the computer 518, or the controller 514, can receive thermodynamic and/or electromagnetic modeling information 607. The thermodynamic and/or electromagnetic modeling information may include behavior of minerals, liquids, and gases for ranges and specific temperatures, pH levels, pressures, ORPs, and/or conductivities that cover various operating limits at different parts of processes. The thermodynamic and/or electromagnetic modeling information can be communicated from the thermodynamic and/or electromagnetic model server 104 of FIG. 1. In one example, historical process information can be used to determine historical analytics via the thermodynamic and/or electromagnetic modeling information and such historical process information can be compared to real-time analytics determined from real-time sensed conditions and operations attributes to determine the accuracy of the thermodynamic and/or electromagnetic modeling information. These accuracy findings can be used to update the thermodynamic and/or electromagnetic modeling information.

At 608, modeling circuitry of the tools server 102, the computer 408, the computer 518, or the controller 514, such as the sales, analytics, and management tools 226 depicted in FIG. 2, can estimate solid chemistry supply levels 609, such as per part of the process, according to the operating attributes 603a, sensed operating conditions 603b, the specifications 605, the thermodynamic and/or electromagnetic modeling information 607, or any combination thereof. In an example, the thermodynamic and/or electromagnetic modeling information 607 may have been derived from historical operating attributes and sensed operating conditions associated with various processes. In one example, analyte values can be determined according to the operating attributes 603a, sensed operating conditions 603b, the specifications 605, and the thermodynamic and/or electromagnetic modeling information 607. In such an example, an analyte value may be a percentage of minerals and/or solid chemistry products in a brine. There may be an analyte value per component of the brine. Also, analyte values may relate to concentrations of minerals, molecules, organic and/or inorganic materials, or any combination thereof. These analyte values can then be used as input to estimate solid chemistry supply levels according to corresponding analyte to solid chemistry level models.

At 610a, a controller (such as controller 514) can regulate (such as by electromechanical control) a solid chemistry feeder (such as feeder 504) according to the estimations of the solid chemistry supply levels. This regulation can occur at parts of the process. For example, the control can be according to estimated solid chemistry supply levels inside a solid chemistry container or connected plumbing. Also, resupplying feeders by inventories, dosage of the solid chemistry products into flowing waters of the container or plumbing, and water flow rates through the container, can be controlled according to the estimated solid chemistry supply levels and/or any other type of information indicative of solid chemistry supply levels described herein.

The tools server 102, the computer 408, the computer 518, or any combination thereof uses at least part of the estimated solid chemistry supply levels to manage solid chemistry supply inventories, operation of corresponding solid chemistry containers, or any combination thereof. Such management can occur per relevant part of the process, such as per solid chemistry container. Also, such management can occur by determining whether levels are acceptable by comparing the levels to a predetermined threshold value, at 610b. This threshold value can also be dynamic. At 612, the tools server 102, the computer 408, the computer 518, or any combination thereof, such as via the tools 226 illustrated in FIG. 2, can log and/or communicate to any one of the servers or computers described herein, parts with acceptable levels of solid chemistry products. At 614, the same computers can log and/or communicate to any one of the servers or computers described herein, parts with unacceptable levels of solid chemistry products. For example, such communications can be directed to any one of the client devices illustrated in FIG. 1.

In the case where levels are unacceptable, tools (such as the tools 226) can determine amounts of solid chemistry products to achieve acceptable levels, at 616. For example, the tools can determine whether to restock or add more of a solid chemistry product to a solid chemistry inventory associated with a solid chemistry container. Such product determinations can be based on received product information 619 and the estimations. The product information can be received from a server, such the service provider server 106, at 618. At 620, anyone of the computers described herein can communicate the parts with the unacceptable levels and the determined amounts of the product(s) to remedy the unacceptable levels. In an example, product recommendation outputs may occur according to the determinations via the sales application or the management application. Also, unacceptable analytics may stand out from acceptable analytics (e.g., per container), such as by various alternatives for emphasizing graphical elements on a display. The alternatives may include highlighting, bolding, italicizing, and/or enlarging the graphical elements that represent the unacceptable analytics. This functionality may assist a sales person in selling products and services to remedy the estimated unacceptable solid chemistry supply levels. The aforementioned operations can repeat until each relevant part of the process is displayed with acceptable analytics and/or unacceptable analytics. The tools can also provide a user interface that can allow end users to adjust various aspects of the displayed analytics to simulate remedying different parts of the process. For example, a user may adjust levels of product and even try alternative products. Also, users may add and remove other displayed items such as parts of the process. In some examples, upon interaction with an analytic, other related analytics can update in real time.

The invention claimed is:

1. A system for restocking a solid chemistry supply within a plumbing system, the system comprising:
    a solid chemistry supply container housing the solid chemistry supply, the solid chemistry supply being a source of a chemical outputted to the plumbing, the solid chemistry supply container being in line with fluid of the plumbing and receiving a fluid within the plumbing such that the fluid contacts the solid chemistry supply;
    a process information generation device configured to generate process information associated with a process using the plumbing;
    a control apparatus, comprising:
        a receiver configured to receive the process information;
        a data processing device communicatively coupled to the receiver, the data processing device configured to:
            receive the process information from the receiver;
            generate an estimated solid chemistry supply level existing inside the solid chemistry supply container by inputting the received process information into a model, the model comprising relationships between a plurality of process information values and a plurality of solid chemistry supply levels and configured to output the estimated solid chemistry supply level in response to receiving the received process information; and
            output a control signal to a feeder to control the feeder according to the generated estimated solid chemistry supply level; and
    further comprising the feeder communicatively coupled to the data processing device, the feeder regulating dosages of the solid chemistry supply fed to the solid chemistry supply container according to the control signal received from the data processing device.

2. The control apparatus of claim 1, wherein the process information includes a relay on time of a pump connected to the plumbing, relay on time of a solenoid of a plumbing valve connected to the plumbing, a blowdown time associated with the plumbing, conductivity of the fluid, oxidation/reduction potential (ORP) of the fluid, or any combination thereof.

* * * * *

UNITED STATES PATENT AND TRADEMARK OFFICE
CERTIFICATE OF CORRECTION

| | | |
|---|---|---|
| PATENT NO. | : 9,989,941 B2 | Page 1 of 1 |
| APPLICATION NO. | : 14/557600 | |
| DATED | : June 5, 2018 | |
| INVENTOR(S) | : Gupta et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 197 days.

Signed and Sealed this
Thirteenth Day of December, 2022

*Katherine Kelly Vidal*

Katherine Kelly Vidal
*Director of the United States Patent and Trademark Office*